United States Patent [19]

Saita

[11] 3,728,628
[45] Apr. 17, 1973

[54] NUMBER-OF-ROTATION DETECTION DEVICE
[75] Inventor: Toshikazu Saita, Himeji, Japan
[73] Assignee: Mitsubishi Denki Kabushiki Kaisha, Tokyo, Japan
[22] Filed: Apr. 26, 1971
[21] Appl. No.: 137,360

[30] Foreign Application Priority Data

Aug. 1, 1969 Japan..........................44/60868
Apr. 28, 1970 Japan..........................45/36560
Aug. 21, 1970 Japan..........................45/83321

[52] U.S. Cl. ..................324/169, 324/161, 340/62, 340/263
[51] Int. Cl.............................................G01p 3/48
[58] Field of Search............................324/161, 169; 340/271, 268, 62, 263

[56] References Cited

OTHER PUBLICATIONS

Marston, R. M.; Solid-State...; Radio-Electronics; April, 1970; pg. 33, 34, 36, 37, 38.

Primary Examiner—Rudolph V. Rolinec
Assistant Examiner—Ernest F. Karlsen
Attorney—Robert E. Burns and Emmanuel J. Lobato

[57] ABSTRACT

The disclosed devices comprise a monostable multivibrator applied with periodic trigger pulses resulting from the rotation of the engine. If the engine has a speed of rotation less than a predetermined speed a voltage charged on a capacitor within the pulse period in the stable state of the multivibrator reaches a breakdown voltage of a Zener diode to produce an output from the latter. Otherwise the voltage across the capacitor does not reach the breakdown voltage to produce no output from the diode.

Two capacitors may charge or discharge with different time constants in the stable state of the multivibrator while one of the capacitors is disabled in accordance with whether the actual speed is higher or lower than the predetermined speed.

3 Claims, 11 Drawing Figures

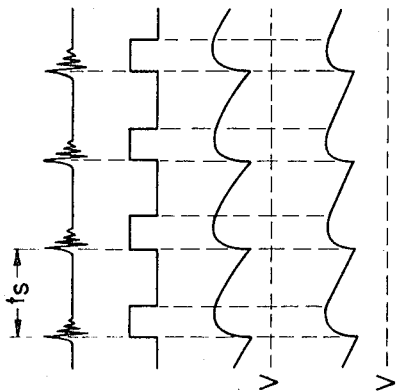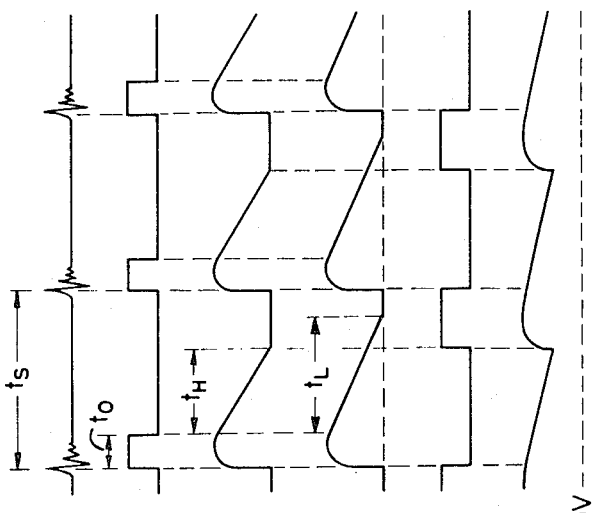

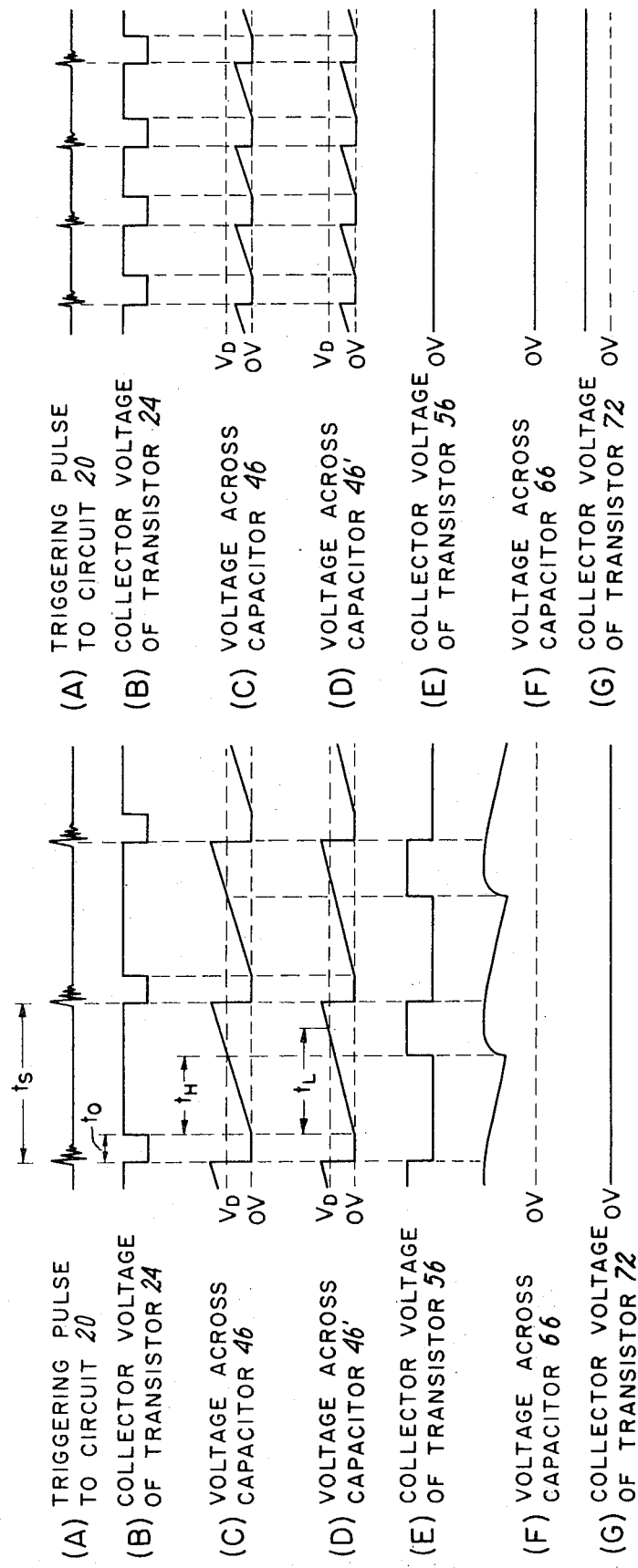

3,728,628

NUMBER-OF-ROTATION DETECTION DEVICE

BACKGROUND OF THE INVENTION

This invention relates to a device for detecting the number of rotations per unit time of a rotary member, and more particularly to a device for determining whether the number of rotations or revolutions per unit time of a rotary member is greater or smaller than a predetermined value.

There have been already proposed rotation detection devices of the type including means for producing, as the rotation detection signal, a train of electrical signals in accordance with the rotational movement of the rotary member, and integration circuit means for integrating the electrical signals with time to form an integrated voltage indicating a measure of the particular number of rotations per unit time of the rotary member. The integrated voltage provided by such an integration circuit means has been continuously changed in magnitude in response to a variation in the number of rotations per unit time of the rotary member. Accordingly the rotation detection devices of the type as above described has been disadvantageous in that due to environment thereof such as a variation in the source voltage, a change in ambient temperature etc., the integrated voltage changes in magnitude as well as the system operation is performed with a time delay because the rotation detection signal resulting from the rotational movement of the rotary member is integrated by the integration circuit means. It is desirable to provide number-of-rotations detection devices including no integration circuit means.

SUMMARY OF THE INVENTION

Accordingly it is an object of the invention to provide a new and improved number-of-rotations detection device for determining whether the number of rotations per unit time of the associated rotary member is greater or smaller than a predetermined value thereof without the necessity of utilizing integration circuit means.

It is another object of the invention to provide a number-of-rotations detection device of the type as described in the preceding paragraph in which the actual value of the number of rotations or revolutions per unit time of the rotary member is selectively compared with a plurality of predetermined values thereof.

It is still another object of the invention to provide a number-of-rotations detection device of the type as above described in the preceding paragraph for effecting the detection of a speed of rotation of the rotary member with a hysteresis characteristic by comparing the actual value of the speed of rotation with a pair of predetermined values thereof.

The invention accomplishes these objects by the provision of a number-of-rotation detection device comprising, in combination, a rotary member, a rotation signal generator circuit for periodically generating rotation detection signals in accordance with the rotational movement of the rotary member, the rotation signals having a predetermined fixed duration, and a repetition period dependent upon the number of rotations per unit time of the rotary member, a time delay circuit responsive to the arrival of each of the rotation signals to produce a time delayed voltage having a magnitude varying with time within the repetition period, and a voltage detector circuit having a threshold voltage and responsive to the time delayed voltage in excess of the threshold voltage thereof to produce an output voltage indicating a measure of whether the number of rotations per unit time of the rotary member is greater or smaller than a predetermined fixed value.

The time delay circuit may preferably include a parallel combination of a resister and a semiconductor diode connected to the output of the rotation signal generator circuit and a capacitor connected in series circuit relationship with the parallel combination of the resistor and diode.

In order to selectively detect a plurality of predetermined values of the number of rotations per unit time of the rotary member, the time delay circuit may include a plurality of time delay networks connected in parallel circuit relationship and different in time constant from one another, each of said time delay networks including a parallel combination of a resistor and a semiconductor diode connected to the output of said rotation signal generator circuit, and a capacitor connected in series circuit relationship with said parallel combination of resistor and semiconductor diode; and one switching means connected to each of said capacitors except for that capacitor being connected in the time delay network having a maximum time constant to short circuit the associated capacitor in accordance with the mode of operation of said rotary member.

The time delay circuit may include a pair of time delay networks connected in parallel circuit relationship and different in time constant from each other, each of said time delay networks to produce the time delayed voltage different in delay time from that produced by the other time delay network, means for disabling one of said time delay networks in accordance with whether the number of rotations per unit time of the rotary member is greater or smaller than a predetermined fixed value thereof.

BRIEF DESCRIPTION OF THE DRAWINGS

The invention will become more readily apparent from the following detailed description taken in conjunction with the accompanying drawings in which:

FIGS. 6a and b are graphic representations of waveforms developed in the arrangement shown in FIG. 5;

FIGS. 8a and b are graphic representations of waveforms developed in the arrangement shown in FIG. 7.

DESCRIPTION OF THE PREFERRED EMBODIMENTS

While the invention is applicable to a variety of rotary members it is particularly suitable for use with internal combustion engines disposed on motor vehicles and therefore it will now be described in conjunction with such an engine.

Figure 1:
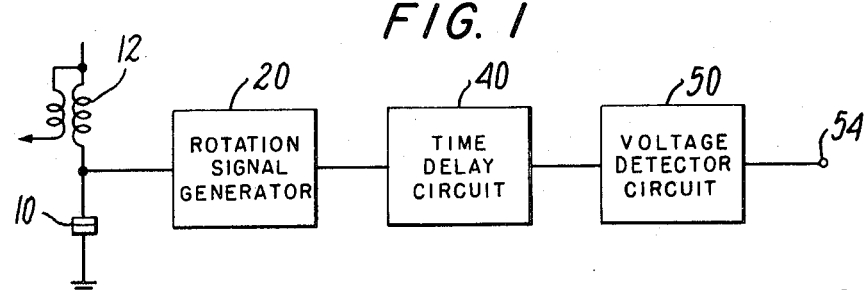
FIG. 1 is a block diagram of a device for detecting the number of rotations or revolutions of a rotary member in accordance with the principles of the invention.
Figure 2:
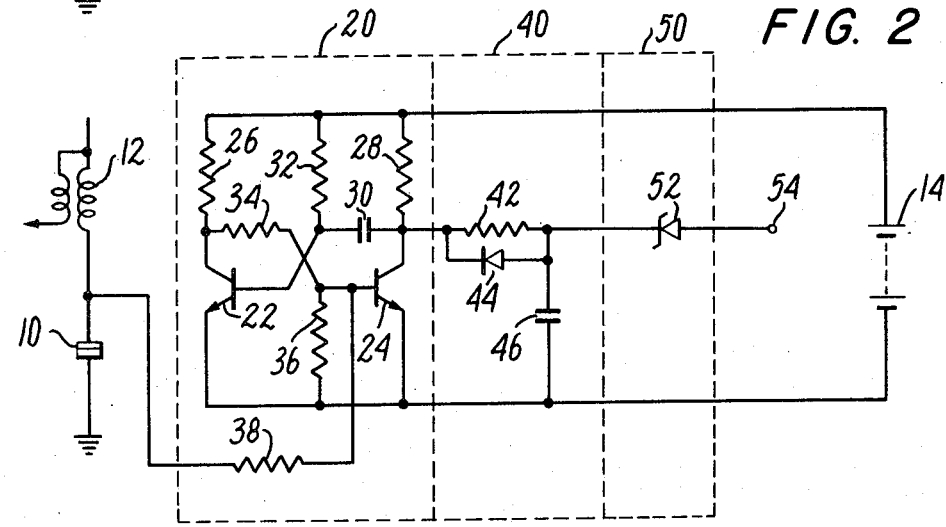
FIG. 2 is a circuit diagram of the details of the device shown in FIG. 1.

Referring to the drawings and FIGS. 1 and 2 in particular, it is seen that a set of breaker's contacts 10 and an ignition coil 12 are serially interconnected in a well known manner for ignition in an internal combustion engine. It is widely known that the contacts 10 are opened and closed in synchronization with the rotational movement of an internal combustion engine involved although the engine is not illustrated in FIGS. 1 and 2.

The junction of the contacts 10 and the ignition coil 12 is connected to an input to a rotation signal generator circuit generally designated by the reference numeral 20. As shown in FIG. 2, the generator circuit 20 is formed of a monostable multivibrator comprising a pair of transistors 22 and 24 including emitter electrodes connected together to a negative terminal of a source of direct current 14 and collecter electrodes connected to the positive terminal of the source 14 through collector resistor 26 and 28 respectively. The transistor 22 is in its normally conducting state and includes a base electrode connected to the collector electrode of the transistor 24 through a coupling capacitor 30 and also to the positive terminal of the source 14 through a resistor 32 while the transistor 24 is in its normally nonconducting state and includes a base electrode connected to the collector electrode of the transistor 22 through a coupling resistor 34 and also to the emitter electrodes of both transistors 22 and 24. The base electrode of the transistor 24 is further connected through an input resistor 38 to the junction of the breaker's contacts 10 and the ignition coil 12. The monostable multivibrator 20 is of a conventional design.

Then the collector electrode of the transistor 24 is connected to a time delay circuit generally designated by the reference numeral 40. As best shown in FIG. 2, the time delay circuit 40 comprises a parallel combination of a resistor 42 and a semiconductor diode 44 having one end connected to the collector electrode of the transistor 24 and a time delay capacitor 46 connected in series circuit relationship with the parallel combination of resistor 42 and diode 44 and also connected to the negative terminal of the source 14. The resistor 42 and the diode 44 form one part of a charging and a discharging circuit for the capacitor 46 respectively.

The junction of the resistor 42 and the capacitor 46 is connected to a voltage detector circuit generally designated by the reference numeral 50. The voltage detector circuit 50 is shown in FIG. 2 as consisting of a Zener diode 52 having a cathode electrode connected to the time delay circuit 40 and an anode electrode connected to an output terminal 54.

The operation of the arrangement as illustrated in FIG. 2 will now be described with reference to FIGS. 3a and b. Assuming that the associated engine (not shown) is in operation, the breaker's contacts 10 are repeatedly opened and closed in accordance with the rotational movement of the engine. Each time the contacts 10 are open, a flow of current through the primary winding of the ignition coil 12 is interrupted to induce a reverse electromotive force across the primary winding as shown at waveform A in FIG. 3a. Therefore the engine is ignited while a triggering pulse is applied to the rotation signal generator circuit 20 to actuate it. That is, the circuit or monostable multivibrator 20 is put in its semistable state where the transistor 24 is conducting for a predetermined fixed time interval after which the transistor 24 is returned back to its nonconducting state as well known in the art. As a result, rectangular pulses having a predetermined fixed duration of $t_o$ is developed at the collector electrode of the transistor 24 as shown at waveform B in FIG. 3a. During the conduction of the transistor 24 the capacitor 46 in the time delay circuit 40 is fully discharged through the diode 44 and the now conducting transistor 24.

Then the monostable multivibrator or the signal generator circuit 20 is returned back to its original state whereupon the transistor 24 is brought into its nonconducting state. This permits the capacitor 46 to be charged from the source 14 through the resistors 28 and 42. Therefore a voltage across the capacitor 46 is exponentially raised with respect to time. That is, the voltage $V_c$ across the capacitor 46 may be expressed by $V_c = E(1 - e^{-\alpha t})$ where $E$ is a voltage across the source 10, $e$ is the base of the Napierian Logarithm and $\alpha$ is a time constant determined by the magnitude of the charging circuit for the capacitor 46. As shown at waveform C in FIG. 3a, the voltage $V_c$ across the capacitor 46 increases until it drops to zero on the occurrence of the succeeding pulse or upon conduction of the transistor 24.

The voltage $V_c$ across the capacitor 46 is then applied to the Zener diode 52. If the voltage $V_c$ does not exceed the Zener voltage $V_Z$ of the diode 52 the latter provides no output at the output terminal 54. However if the voltage $V_c$ exceeds the Zener voltage $V_Z$ the diode 52 provides an output voltage of $(V_c - V_Z)$ at the output terminal 54 as shown at waveform D in FIG. 3a.

Therefore in case the engine has the number of rotations per unit time less than a predetermined fixed value thereof, then a time interval between each pair of adjacent spark ignition or a repetition period of the triggering pulses applied to the monostable multivibrator 20 is long enough to charge the capacitor 46 with a voltage in excess of the Zener voltage of the diode 52 within that time interval with the result that the detector circuit 50 provides the output waveform C (see FIG. 3a) at the output terminal 52.

Figure 3A:
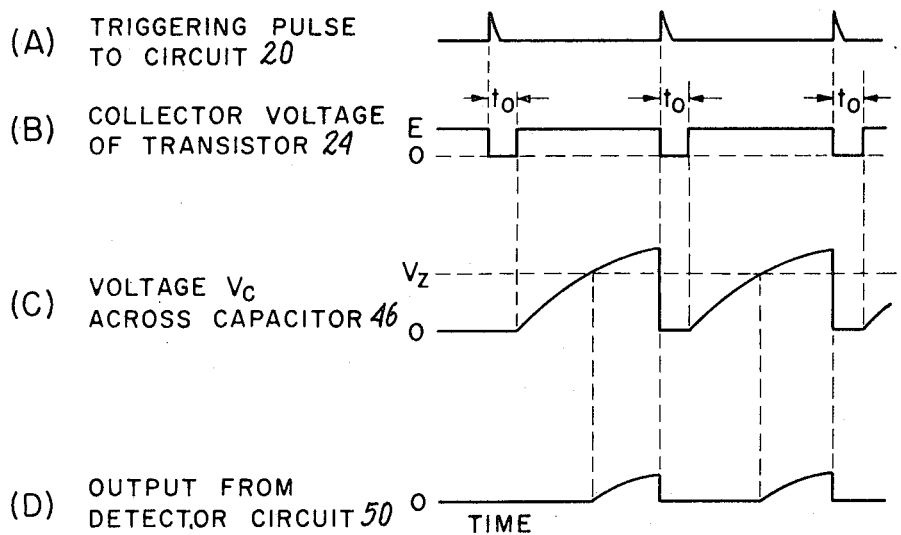
FIGS. 3a and b are graphic representations of waveforms useful in explaining the operation of the arrangement shown in FIG. 2.
Figure 3B:
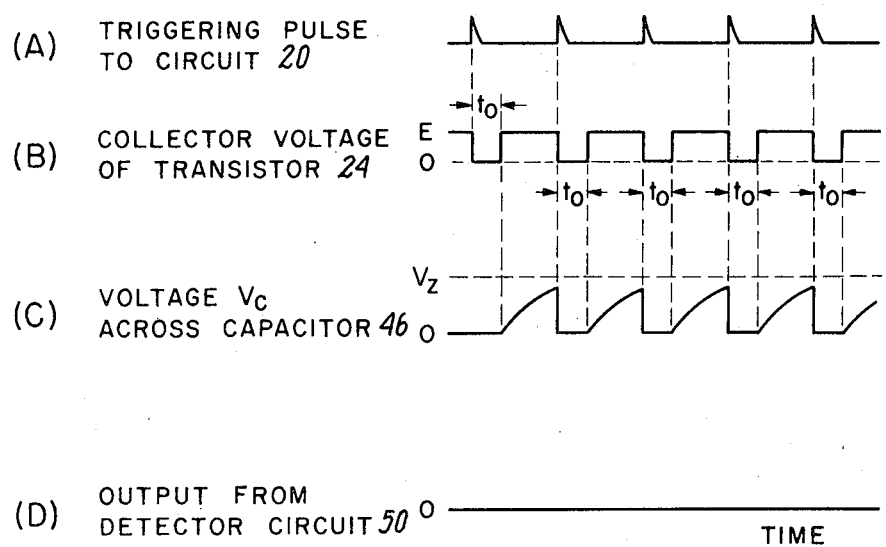

On the contrary if the number of rotations per unit time of the engine becomes higher than the predetermined value then the time interval between the adjacent spark ignition decreases to such an extent that the capacitor 46 is only charged with a voltage below the Zener voltage $V_Z$ of the diode 52 within each ignition time interval until it is discharged through the succeeding operation of the monostable multivibrator 20 as shown at waveform C in FIG. 3b. Therefore the detector circuit 50 provides a null voltage at the output terminal 54 as shown at waveform D in FIG. 3b. In FIG. 3b wherein the reference characters "A" and "B"

designate the respective waveforms corresponding to the waveforms A and B of FIG. 3a and developed with the number of rotations per unit time of the engine exceeding the predetermined value thereof.

From the foregoing it will be appreciated that the presence or the absence of the output voltage at the output terminal 54 can determine whether the number of rotations or revolutions per unit time of the associated engine is lower or higher than a predetermined fixed value thereof as long as the Zener or threshold voltage of the diode 52 is selected to correspond to the predetermined fixed value.

While the invention has been described in conjunction with a single predetermined fixed value of the number of rotations per unit time of the associated engine it is equally applicable to the case the number of rotations per unit time of the engine is to be selectively detected for a plurality of predetermined fixed values thereof.

Figure 4:
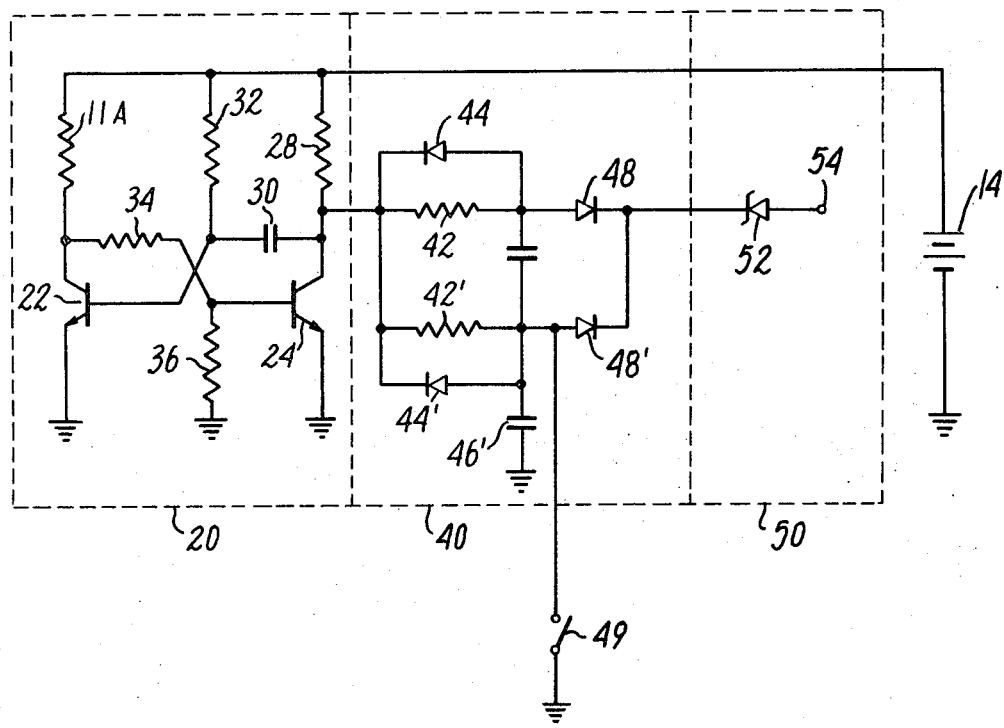
FIG. 4 is a circuit diagram of a modification of the invention wherein the actual number of rotations per unit times of a rotary member is selectively compared with a plurality of reference values thereof.

Referring now to FIG. 4 wherein like reference numerals designate the components identical to those shown in FIG. 2, it is seen that the time delay circuit 40 comprises a pair of parallel combinations each including a charging resistor 42 or 42', a semiconductor discharging diode 44 or 44' and a capacitor 46 or 46' disposed in the same circuit relationship as to the resistor 42, the diode 44 and the capacitor 46 shown in FIG. 2 excepting that in FIG. 4 the capacitor 46 is connected at one end to the junction of the resistor 42' and the capacitor 46' rather than the negative terminal of the source 14. The resistors 42 and 42' are different in magnitude of resistance from each other and connected to the respective semiconductor output diodes 48 and 48' and thence to the Zener diode 52 in the detector circuit 50 with the junction of the resistor 42' and the diode 48 connected to ground through a normally open switch 49. In other respects the arrangement is identical to that shown in FIG. 2.

It is assumed that the switch 49 is maintained in its open position illustrated in FIG. 4. During the operation of the associated engine triggering pulses having a repetition period of $t_s$ are applied to the monostable multivibrator 20 to conduct the transistor 24 for a predetermined fixed time interval of $t_o$ as in the arrangement shown in FIG. 2. Therefore both capacitors 46 and 46' are fully discharged. Then when the monostable multivibrator 20 is returned back to its original stable state where the transistor 24 is in its nonconducting state, the capacitors 46 and 46' begin to be charged from the source 14 through the collector resistor 28 and their own resistors 42 and 42' with different time constants or time delays respectively. Thus a voltage across the capacitor 46 will reach the Zener voltage of the Zener diode 52 in the voltage detector circuit 50 upon a time interval of $t_{r1}$ timed out after the monostable multivibrator 20 has been returned back to its stable state. Similarly, a voltage across the capacitor 46' will reach the same Zener voltage upon a time interval of $t_{r2}$ being timed out from the same time point as does the time interval of $t_{r1}$, only for purpose of illustration it is assumed that the time interval of $t_{r1}$ is longer than that of $t_{r2}$.

In this way the capacitors 46 and 46' are repeatedly charged and discharged. If the number of rotations per unit time of the associated engine (not shown) is low such that the repetition period $t_s$ of the rotation signals or triggering pulses applied to the monostable multivibrator 20 is longer than the sums of the time interval $t_o$ for which the multivibrator 20 is in its semistable state plus either of the rise times $t_{r1}$ and $t_{r2}$ required for the voltages across the capacitors 46 and 46' to reach the predetermined value or Zener voltage of the diode 52, that is, $t_s > (t_o + t_{r1}) > (t_o + t_{r2})$ then the voltages across the capacitors 46 and 46' become higher than the Zener voltage of the diode 52 or the predetermined fixed voltage to be detected by the detector circuit 40. Therefore, the detector circuit 50 or the Zener diode 52 provides at the output terminal 54 an output voltage corresponding to the actual number of rotations for unit time of the engine.

Then if the engine increases in the number of rotations per unit time so that the relationship $(t_o + t_{r1}) > t_s > (t_o + t_{r2})$ is held then the voltage across the capacitor 46 is discharged through the succeeding conduction of the transistor 24 before it will reach the Zener voltage of the diode 52. This results in the generation of a null voltage at the output terminal 54. However, the voltage across the capacitor 46' exceeds the Zener voltage of the diode 52. Accordingly, the Zener diode 52 is broken down to produce at the output terminal 54 and output voltage dependent upon the actual number of rotations per unit time of the engine.

A further increase in the number of rotations per unit time of the engine causes the relationship $t_s < (t_o + t_{r2}) < (t_o + t_{r1})$ to be held. As a result, both the capacitors 46 and 46' are caused to discharge before the voltages thereacross reach the Zener voltage of the diode 52. This leads to no output signal appearing at the output terminal 54.

Thus it will be appreciated that the time delay circuit 40 includes the two capacitors 46 and 46' and the associated charging circuits providing a pair of time delay networks different in delay time or time constant from each other and that whether the time interval $t_s$ between each pair of rotation signals or the repetition period thereof is greater or smaller than the sum of the time interval $t_o$ for which the monostable multivibrator 20 is in its semistable state and of the rise time $t_{r2}$ of voltage across the capacitor 46' can determine the predetermined value of the number of rotations per unit time of the engine. It is noted that the predetermined value is determined by that time delay network smaller in time delay or time constant and including the capacitor 46'.

Assuming that the switch 49 is put in its closed position, the capacitor 46' is shortcircuited to be disabled to perform the time delaying operation. At the same time the diode 48' is reversely biased to exhibit no effect upon the detector circuit 50. Therefore that time delay network longer in time constant and including the capacitor 46 is enabled to perform the time delaying operation thereby to determine whether the time interval $t_s$ is greater or smaller than the time interval $(t_o + t_{r1})$. This results in the determination of another predetermined value of the number of rotations per unit time or a speed of rotation of the associated engine different from the speed of rotation for the switch 49 in its open position.

If desired, more than two of the time delay networks connected in parallel to one another such as shown in FIG. 4 may be used to selectively determine a plurality of the numbers of rotations per unit time of the associated engine in accordance with the mode of operation thereof. In that event, individual normally open switches such as the switch 49 shown in FIG. 4 are connected across each of serially connected capacitors expect for that capacitor providing a maximum delay time. While the switch 49 is shown in FIG. 4 as being a mechanical switch, it is to be understood that if desired the switch 49 may be semiconductor switch.

While the invention has been described in terms of the time delay network formed of the capacitor charging circuit it is to be understood that in practicing the invention the time delay network can be formed of a capacitor discharging circuit which will be subsequently described in FIG. 5.

Figure 5:
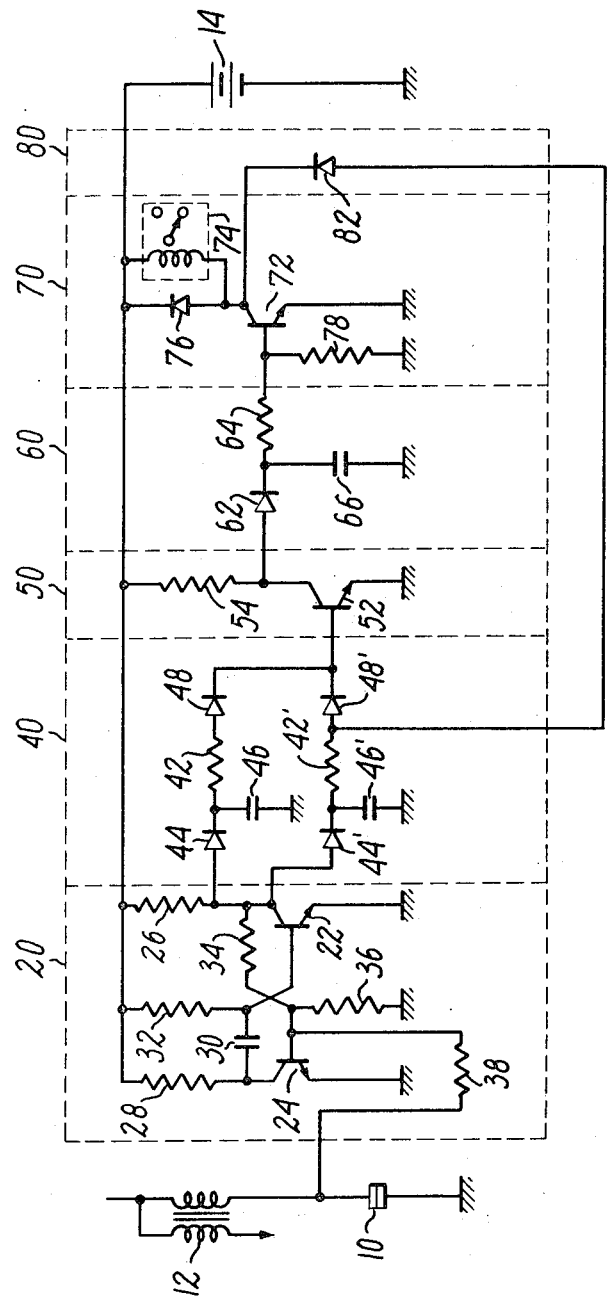
FIG. 5 is a circuit diagram of another modification of the invention wherein the actual values of the number of rotations per unit time of a rotary member is compared with a plurality of predetermined fixed values thereof.

In FIG. 5 wherein like reference numerals have been employed to identify the components identical or corresponding to those shown in FIG. 2 or 4, it is seen that the time delay circuit 40 includes a pair of parallel time delay networks each formed of a semiconductor diode 44 and 44' a discharging resistor 42 or 42', and semiconductor output diode 48 or 48' serially connected in the named order. The junction of the diode 44 or 44' and the resistor 42 or 42' is connected to ground through the capacitor 46 or 46'.

The diode 44 and 44' are connected at their anode electrodes to the collector electrode of the normally conducting transistor 22 included in the monostable multivibrator 20 identical to that shown in FIG. 2 or 4. The output diodes 48 and 48' are connected at their cathode electrodes to a base electrode of a transistor 52. The transistor 52 includes an emitter electrode connected to ground and a collector electrode connected to the source 14 through a collector resistor 54 to form the voltage detector circuit 50.

The collector electrode of the transistor 52 is also connected to a timing holder circuit generally designated by the reference numeral 60. The circuit 60 includes a series combination of a semiconductor diode 62 and a discharging resistor 64 with the anode electrode of the diode 62 connected to the collector electrode of the transistor 52. The junction of the diode 62 and the resistor 64 is connected to ground through a holder capacitor 66.

As shown in FIG. 5, a switching circuit generally designated by the reference numeral 70 comprises a switching transistor 72 including a base electrode connected to the resistor 64 in the timing holder circuit 60, an emitter electrode connected to ground and a collector electrode connected to the source 14 through a winding of a delay 74 connected across a semiconductor diode 76. A resistor 78 is connected across the base and emitter electrodes of the transistor 72.

The collector electrode of the transistor 72 is also connected to a gate circuit generally designated by the reference numeral 80. The gate circuit 80 is shown in FIG. 5 as consisting of a semiconductor diode 82 including a cathode electrode connected to the collector electrode of the transistor 72 and an anode electrode connected to the anode electrode of one of the output diodes disposed in the capacitor discharging network having a greater time constant, in this case of the lower diode 48' as viewed in FIG. 5.

The operation of the arrangement illustrated will now be described in conjunction with FIGS. 6a and b. It is now assumed that the associated engine (not shown) has the actual number of rotations per unit time or a speed of rotation N less than a predetermined value $N_{ON}$. As in the arrangement shown in FIG. 2, the set of breaker's contacts 10 responds to the rotational movement of the engine to be repeatedly opened and closed to cause voltages of waveform A shown in FIG. 6a to be applied to the monostable multivibrator 20 to bring it into the semistable state for a predetermined fixed duration of $t_o$ with a predetermined repetition period of $t_s$. In the semistable state the transistor 22 becomes nonconducting and the collector voltage thereof is high as shown at waveform B in FIG. 6a. During the time interval of $t_o$ the source 14 fully charges the capacitors 46 and 46' through the collector resistor 26 (see waveforms C and D, FIG. 6a) and the respective diodes 44 and 44' and further supplies a base current to the transistor 52 in the detector circuit 50 through the resistors 42 and 42' and the diodes 48 and 48' to bring it in the conducting state. At the end of the time interval $t_o$ or as soon as the monostable multivibrator 20 is returned back to its stable state, the capacitors 46 and 46' are initiated to discharge with the different time constants as schematically shown at waveforms C and D in FIG. 6a. Under these circumstances, it is noted that the discharge current from the capacitor 46 having a lower time constant $t_H$ for discharge is principally supplied through the resistor 42 and the diode 48 to the base electrode of the transistor 52 continue to put it in the conducting state as will be apparent hereinafter.

Upon the time interval $t_H$ having lapsed after the monostable multivibrator 20 has been returned back to its stable state, the capacitor 46' has fully discharged to put the transistor 52 in its nonconducting state. This causes an increase in voltage at the collector electrode of the transistor 52 as shown at waveform E in FIG. 6a. The transistor 52 in its nonconducting state permits the timing holder capacitor 66 to charge from the source 14 through the collector resistor 54 and the diode 62 as shown at waveform F in FIG. 6a. Simultaneously the switching transistor 72 is applied with a base current from the source 14 through the components 54, 62 and 64 to become conducting. Therefore the collector electrode of the transistor 72 is at a zero potential as shown at waveform G in FIG. 6a and the winding of the relay 74 is energized from the source 14 to put the relay in its operating position where the relay provides an output signal.

Each time the succeeding rotation signal is applied to the transistor 24 the process as above described is repeated to maintain the transistor 52 in its conducting state for the time interval of $(t_o + t_H)$ after the application of that detection signal. By rendering the discharge time for the holder capacitor 66 greater than the time interval of $(t_o + t_H)$, the switching transistor 72 continues to be in its "ON" state with its base current continuously applied thereto. Therefore the transistor 72 is held in its "ON" state and hence the relay 74 is maintained in its operating state as long as the repetition period $t_s$ of the triggering signal is greater than sum of the conduction time $t_o$ of the transistor 22 and the discharge time $t_H$ of the timing holder capacitor 46. This means that the system has an operating speed of rotation $N_{ON}$ equal to the reciprocal of the $(t_o + t_H)$.

As above described, the transistor 72 continues to in its "ON" state as long as the associated engine is rotating at a speed N smaller than the $N_{ON}$. Accordingly the discharge current from the capacitor 46' higher in time constant $L_L$ for discharge flows through the gating diode 82 into the now conducting transistor 72 but not into the transistor 52.

If the associated engine has its speed of rotation N higher than the predetermined speed $N_{ON}$ then the arrangement of FIG. 5 has developed thereon waveforms A through G as shown in FIG. 6b corresponding to waveforms A through G as shown in FIG. 6a. More specifically the repetition period $t_s$ is smaller than that $t_o + t_H$ so that the detection transistor 52 continues to be conducting because the base current is continuously applied to the base electrode thereof. Thus the switching transistor 72 remains in its "OFF" state without the base current applied thereto and the relay 76 is in its inoperative position where it provides no output.

This transistor 72 in its "OFF" state causes the gating diode 82 to be reversely biased thereby to permit the time delay capacitor 46' to supply a discharge current to the base electrode of the detection transistor 52. Since the discharge time $t_L$ for the capacitor 46' is preselected to be greater than the discharge time $t_H$ for the capacitor 46, the base current continues to be applied to the transistor 52 before the repetition period $t_s$ of the rotation signals becomes equal to the interval of $(t_o + t_L)$. This means that the system has a reset speed of rotation $N_{OFF}$ equal to the reciprocal of the $(t_o + t_L)$.

That is, the arrangement of FIG. 5 exhibits the hysteresis characteristic having the operating speed of rotation $N_{ON}$ equal to $1/(t_o + t_H)$ and the reset speed of rotation $N_{OFF}$ equal to $1/(t_o + t_L)$, where the $t_L$ is greater than the $t_H$.

Figure 7:
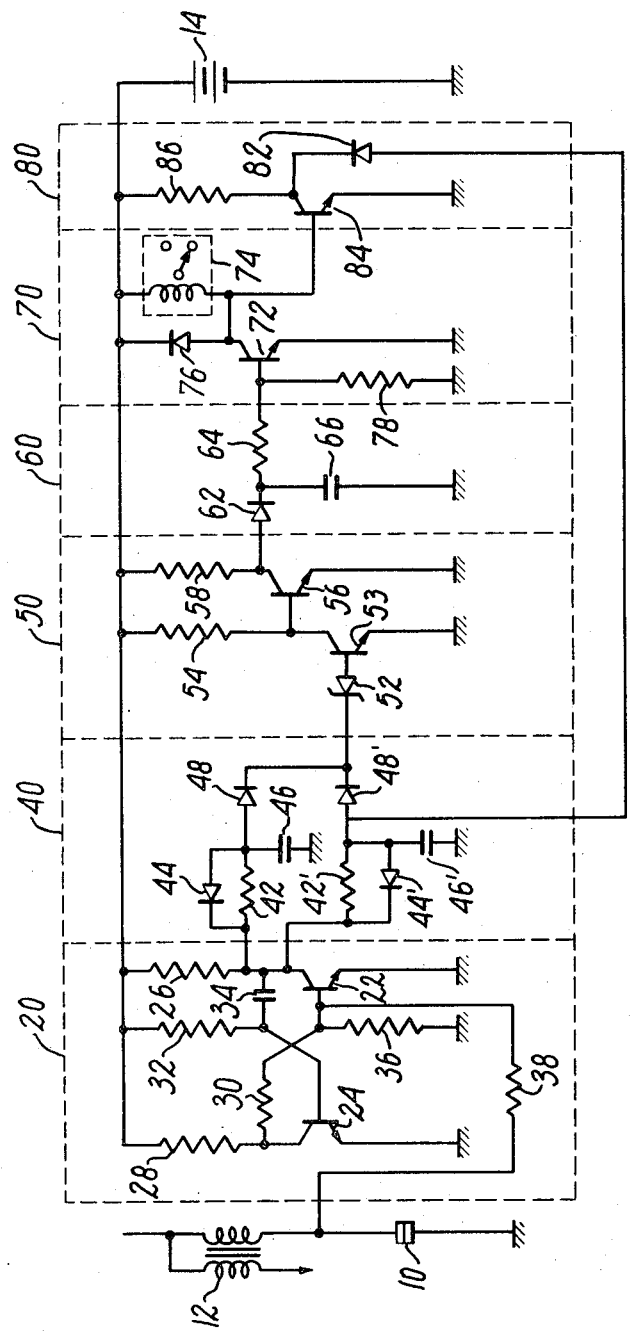
FIG. 7 is a circuit diagram of a modification of the arrangement shown in FIG. 6.

While the arrangement of FIG. 5 utilizes the discharge of the capacitors to provide the time delayed voltages it is to be understood that for the same purpose it can be effectively modified to utilize the charge of the capacitors such as shown in FIG. 7.

In FIG. 7 wherein like reference numerals designate the components identical or similar to those shown in FIGS. 2 or 5 it is seen that the normally nonconducting transistor 24 in the monostable multivibrator 20 is connected to the time delay circuit 40 identical to that shown in FIG. 2 or 4 excepting that the capacitor 46 disposed in the smaller time constant network is connected to the gating diode 82. Also the voltage detector circuit 50 comprises a normally nonconducting transistor 53 connected to the Zener diode 52 and a normally conducting transistor 56 directly coupled to the transistor 53. The transistor 53 includes a base electrode connected to the anode electrode of the Zener diode 52, an emitter electrode connected to ground and a collector electrode connected to the source 14 through a resistor 54. The transistor 56 includes a base electrode connected to the collector electrode of the transistor 53, an emitter electrode connected to ground and a collector electrode connected to the source 14 through a resistor 58.

The gating circuit 70 is shown in FIG. 7 as comprising the semiconductor gate diode 72 including the anode electrode connected to the junction of the capacitor 46 and the output diode 48 and the cathode electrode connected to a collector electrode of a normally nonconducting transistor 84. The collector electrode of the transistor 84 is also connected to the source 14 through a collector resistor 86 and the emitter electrode thereof is connected to ground. The transistor 84 includes a base electrode connected to the collector electrode of the switching transistor 72. In other respects the arrangement is identical to that shown in FIG. 5.

It is assumed that the associated engine (not shown) is rotating at a speed of rotation N below a predetermined speed of rotation $N_{ON}$. As in the previous arrangements, the triggering pulses with a repetition period of $t_s$ (see waveform A, FIG. 8a) are successively applied to the monostable multivibrator 20 to repeat the process as already described in conjunction with FIGS. 2 and 4 and the waveforms B and C shown in FIG. 3a. Briefly the transistor 24 is put in its conducting state for a predetermined fixed time interval of $t_o$ as shown at waveform B in FIG. 8a and as soon as the transistor 24 is returned back to its nonconducting state the capacitors 46 and 46' beginning to charge with the respective time constants as schematically shown at waveforms C and D in FIG. 8a. Then the voltages across the capacitors 46 and 46' reach a predetermined fixed voltage $V_D$ to be detected by the detector circuit 40, in this case, the Zener voltage of the diode 52 after the lapse of time intervals of $t_H$ and $t_L$ from the returning back of the transistor 24 to its nonconducting state or of the monostable multivibrator 20 to its stable state respectively. At that time the diode 52 is broken down to supply a base current to the transistor 53 to conduct it. This conduction of the transistor 53 causes the transistor 56 to become nonconducting as shown at waveform E in FIG. 8a. Then the process as above described in conjunction with FIGS. 5, 6a and b are repeated to put the relay 74 in its energized state. In FIG. 8a waveforms F and G depict the voltage across the capacitor 66 and the voltage at the collector electrode of the transistor.

As in the arrangement of FIG. 5, the discharge time for the holding capacitor 66 has been selected to be greater than the time interval of $t_o + t_H$. Therefore the transistor 72 continues to be conducting and accordingly the relay 14 is maintained in its operating state. Thus it will be appreciated that the system has its operating speed of rotation $N_{ON}$ equal to the reciprocal of the $(t_o + t_H)$.

On the other hand, the transistor 84 in the gating circuit 80 is in its nonconducting state because the transistor 72 is maintained in its "ON" state. This causes the gating diode 82 to be reversely biased with the result the delay time provided by the time delay circuit 40 is determined by the charging time $t_H$ required for the capacitor 46 to be charged to the predetermined. This charging time $t_H$ is smaller than the corresponding charging time $t_L$ for the other capacitor 46'.

If the speed of rotation N is greater than the predetermined fixed speed of rotation $N_{ON}$ then the arrangement of FIG. 7 has developed thereon the corresponding waveforms labelled the reference characters A, B, C, D, E, F, and G in FIG. 8b. In that event the repetition period or time interval $T_s$ between rotation signals is shorter than the time interval of $(t_o + t_H)$ so that the output voltage from the time delay circuit 40 does not reach the threshold voltage $V_D$ of the detector circuit 50. Thus the transistor 53 remains nonconducting while the transistor 56 is maintained in its conducting state. Thus the transistor 72 has applied thereto no base current and remains in its "OFF" state thereby to maintain the relay in its deenergized or inoperative state.

Also since the transistor 72 is in its "OFF" state the transistor 84 disposed in the gating circuit 80 is in its conducting state to permit the gating diode 82 to be forwardly biased. Therefore, the charged voltage on the capacitor 46 is clamped to the sum of the forward voltage across the diode 82 and the saturated voltage of the transistor 84 and always remains lower than the threshold voltage $V_D$ of the detector circuit 50.

Even if the actual speed of rotation N decreases to the predetermined fixed speed of rotation $N_{ON}$ the system remains in its mode of operation for N $N_{ON}$ because the output from the time delay circuit 40 is below the threshold voltage $V_D$ of the circuit 50. A further decrease in speed of rotation N will cause the repetition period $t_s$ to be equal to the time interval of $(t_o + t_L)$. At that time the voltage across the capacitor 46' reaches the threshold voltage $V_D$. Then if the repetition period $t_s$ becomes greater than the time interval of $(t_o + t_L)$ a base current is again applied to the transistor 53 to repeat the process as above described resulting in the energization of the relay 74. Thus it will be appreciated that the arrangement shown in FIG. 7 has a reset speed of rotation $N_{OFF}$ equal to the reciprocal of the $(t_o + t_L)$. That is, the arrangement exhibits the hysteresis characteristic having the operating speed of rotation $N_{ON} = 1/(t_o + t_H)$ and the reset speed of rotation $N_{ON} = 1/(t_o + t_H)$ and $N_{OFF} = 1/(t_o + t_L)$.

While the invention has been illustrated and described in conjunction with a few preferred embodiments thereof it is to be understood that numerous changes and modifications may be resorted to without departing from the spirit and scope of the invention. For example, the rotation detecting signals for the rotary member may be provided by a reed switch operative to be open and closed in accordance with the rotational movement of the rotary member or the engine. In the latter event, the ignition coil, the breaker's contacts and the monostable multivibrator are omitted. Also the voltage detector circuit may be formed of a Schmitt trigger circuit. Further the invention is equally applicable to the detection of a speed of a vehicle. To this end, one wheel of the vehicle driven by the associated engine may be utilized to produce the triggering pulses for applying the monostable multivibrator.

I claim:

1. A number-of-rotations detection device comprising, a rotation pulse generator circuit for periodically generating pulses in dependence upon the rotational movement of a rotary member, means in said pulse generator circuit causing said pulses to have a duration dependent upon the number of rotations per unit time of the rotary number, means for integrating each of the pulses for at least the duration of each pulse to produce an amplitude dependent on the pulse duration and for returning the amplitude to zero value, means for detecting whether the amplitude of the integrated pulses is above or below a predetermined value to determine whether the number of rotations per unit time of the rotary member is above or below a predetermined value, said means for integrating including a plurality of pulse generator means for generating a plurality of sloped pluses different in rate of change in voltage from one another during the periods of the first-mentioned pulses, a selection switch for selecting sloped pulses, and voltage detection means receptive of the sloped pulses selected by the selection switch to produce an output in response to the applied sloped pulses having a voltage exceeding a predetermined magnitude.

2. A number-of-rotation detection device as claimed in claim 1, wherein the selection switch comprises means controlled in response to an operating state of an associated internal combustion engine.

3. A number-of-rotation detection device as claimed in claim 1, wherein the selection switch means is controlled in response to an output from said voltage detection means.

* * * * *